United States Patent [19]

Tartarini

[11] 3,902,302
[45] Sept. 2, 1975

[54] MACHINE FOR VACUUM PACKAGING VARIOUS PRODUCTS
[76] Inventor: Cesare Tartarini, Via Colombo, 9, Zola Predosa, Bologna, Italy
[22] Filed: Sept. 23, 1974
[21] Appl. No.: 508,320

[30] Foreign Application Priority Data
Oct. 5, 1973 Italy................................. 3510/73

[52] U.S. Cl............................................. 53/112 A
[51] Int. Cl.².......................................... B65B 31/06
[58] Field of Search.................................. 53/112 A

[56] References Cited
UNITED STATES PATENTS
3,009,298  11/1961  Gerlach et al. ............... 53/112 A X
3,061,984  11/1962  Mahaffy....................... 53/112 A X Primary Examiner—Travis S. McGehee
Attorney, Agent, or Firm—Dr. Guido Modiano; Dr. Albert Josif

[57] ABSTRACT

A machine for vacuum packaging various products which comprises means for supporting two reels of strip for forming the product containers, means for forming in at least one of said strips cavities for housing the products in transverse and longitudinal parallel rows, welding means for longitudinally and transversely welding the strips around the edges of said cavities after depositing the products to be packaged in them. In addition it comprises a carriage driven with reciprocating motion parallel to the strip feed direction, a plurality of suction tubes supported by said carriage and positioned so as to penetrate between the strips at the point where they become superimposed, and connected to suction means for evacuating the formed cavities. Also provided are pincer means for gripping the lateral edges of the strips, which are disposed at the height of the welding means and are forced in the direction of mutual withdrawal to keep the strips taut during the welding stage.

6 Claims, 5 Drawing Figures

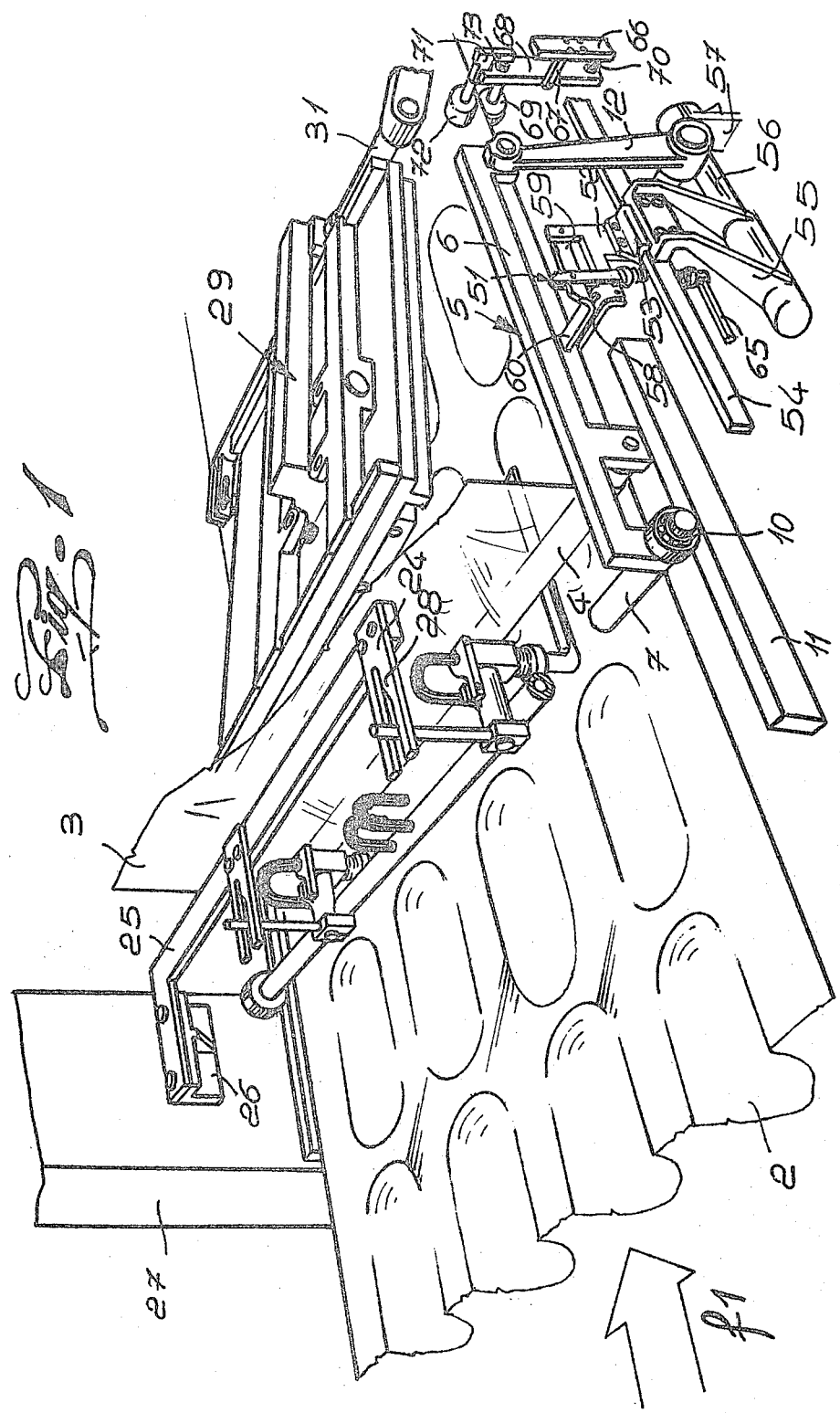

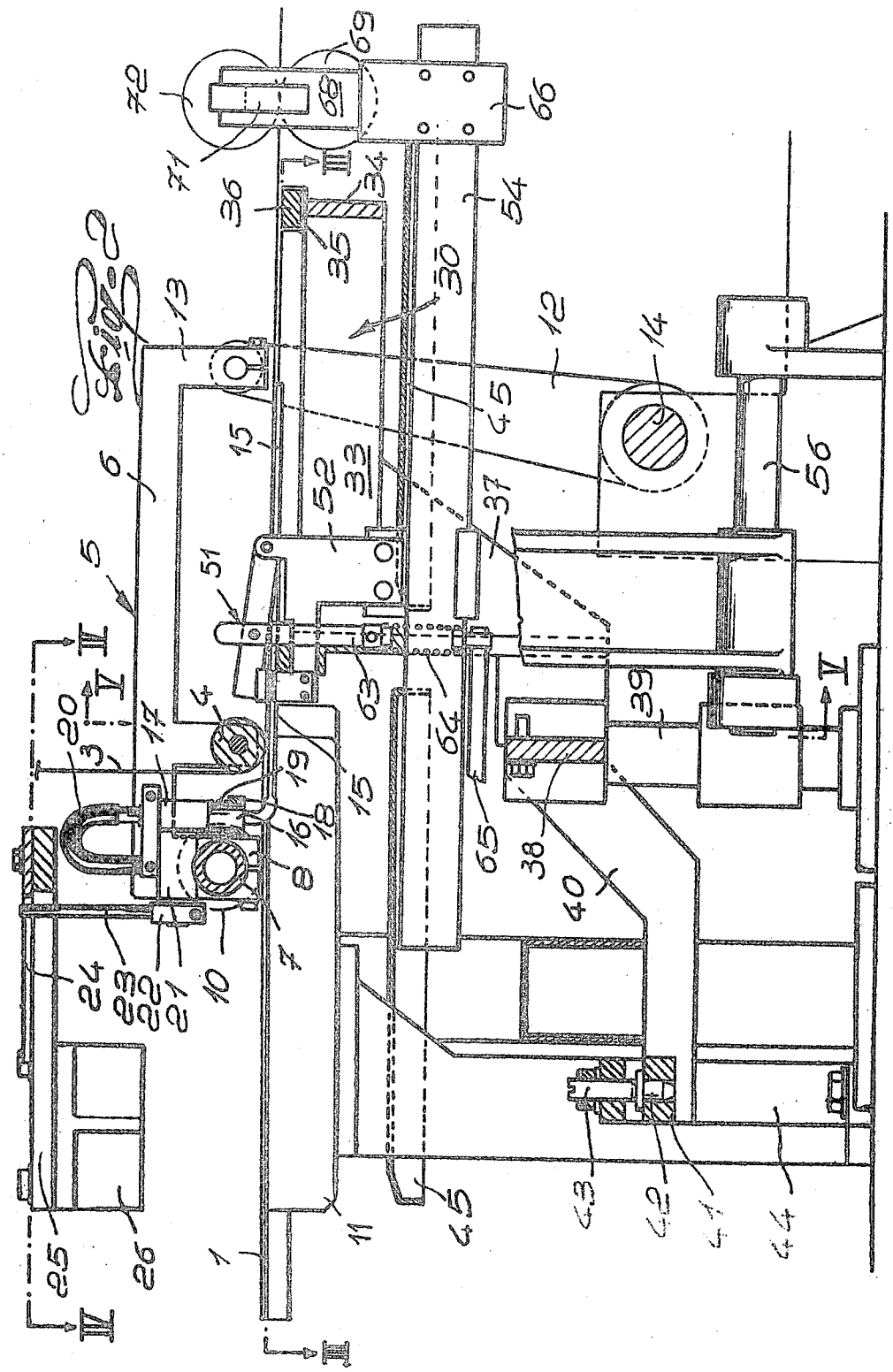

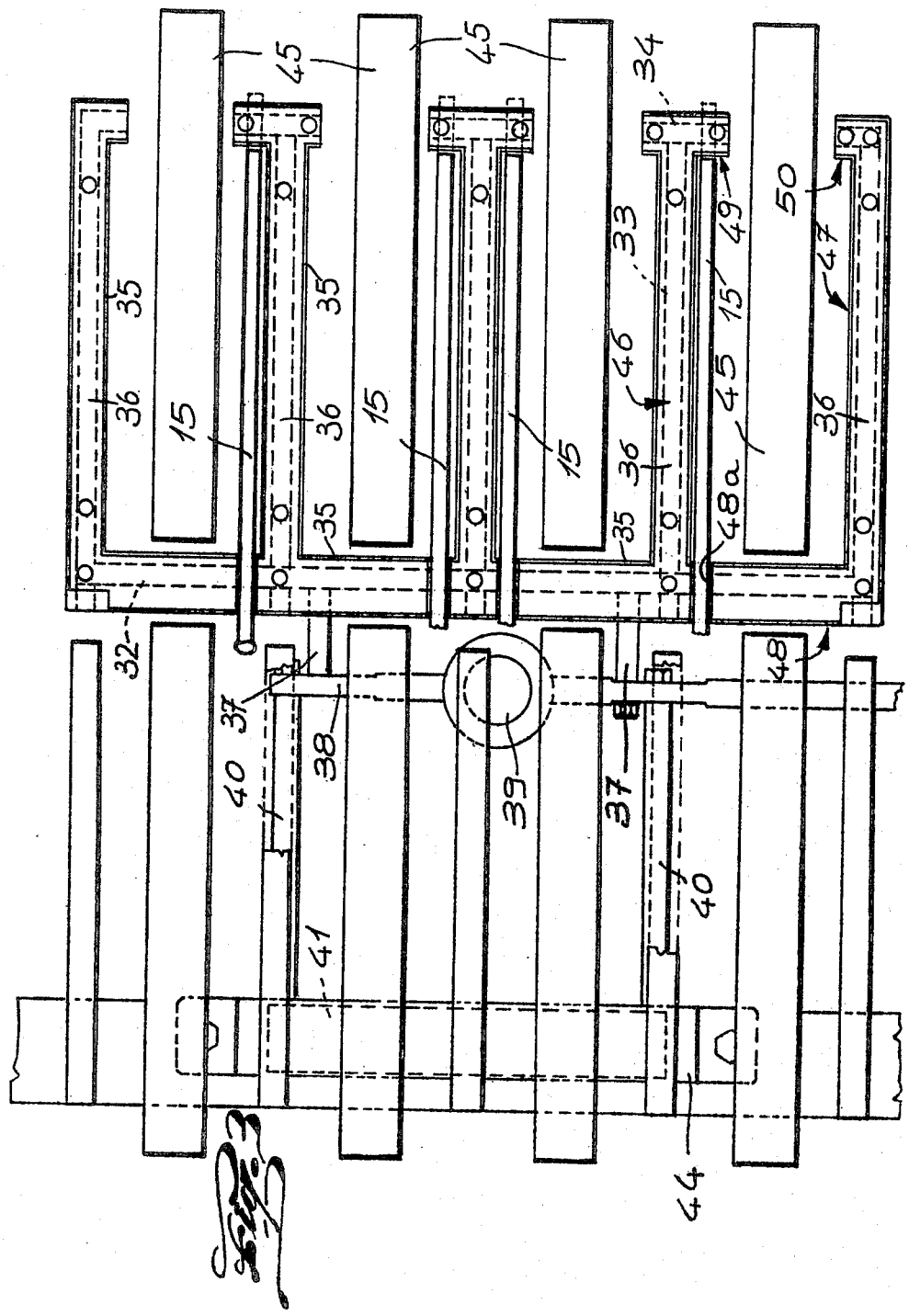

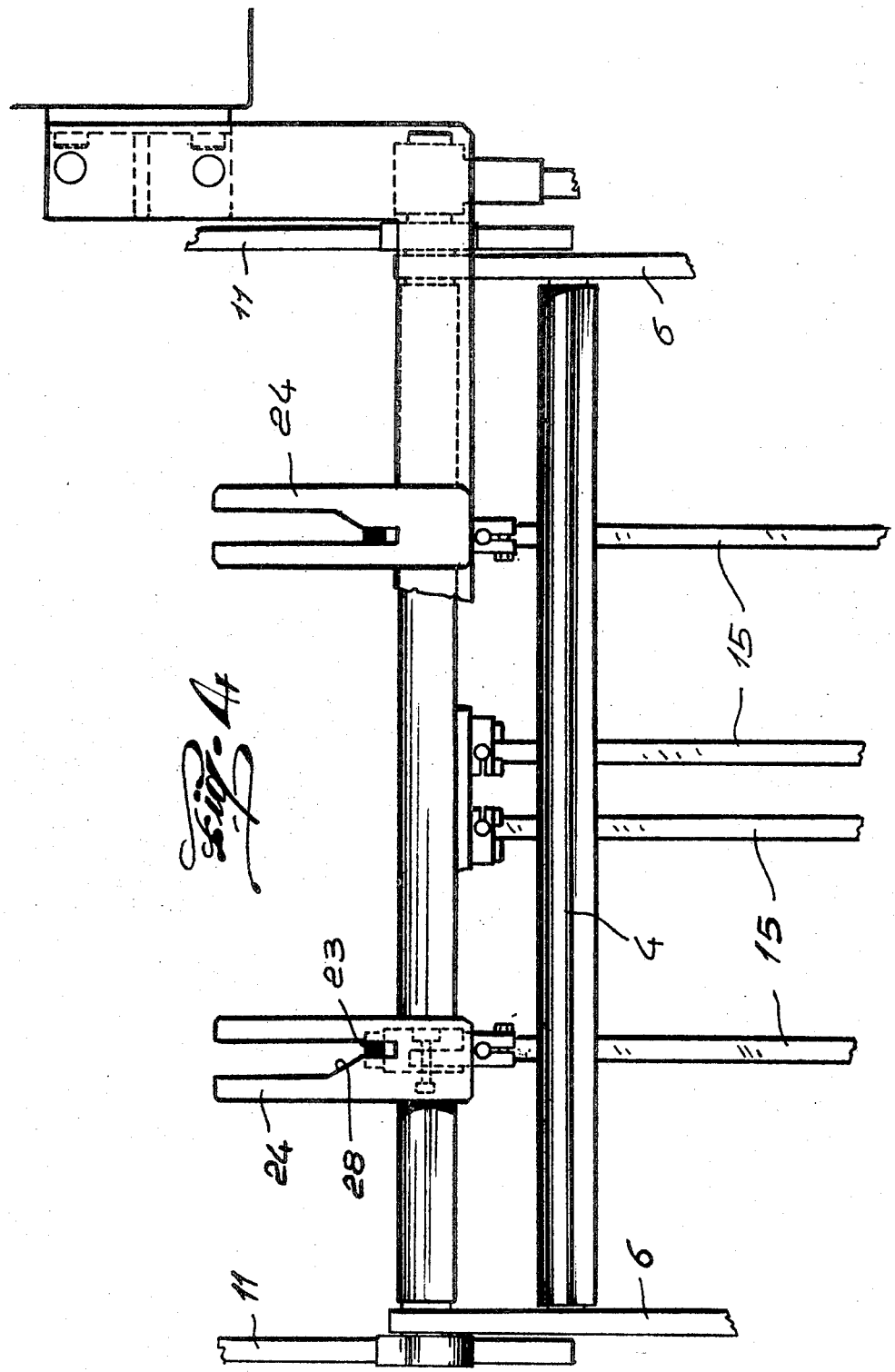

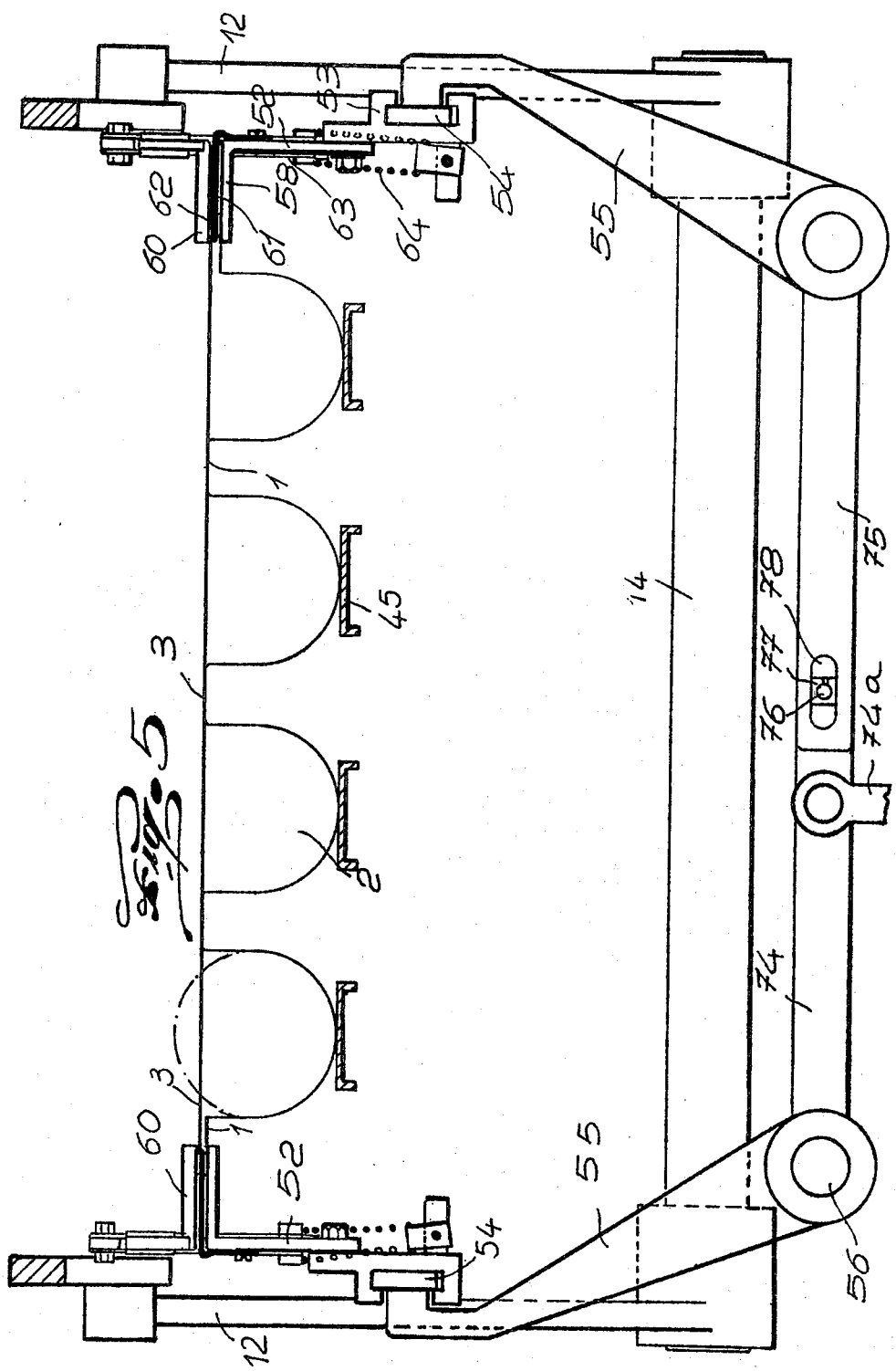

MACHINE FOR VACUUM PACKAGING VARIOUS PRODUCTS

BACKGROUND OF THE INVENTION

This invention relates to a machine for vacuum packaging various products, in particular food products, comprising means for supporting two reels of strip for forming the product containers, means for forming cavities in at least one of said strips for housing the products in transverse and longitudinal parallel rows, and welding means for longitudinally and transversely welding the strips around the edges of said cavities after having deposited the products to be packaged in them.

In known machines of this type, some disadvantages have arisen where strips of certain materials have been used for the containers.

In this regard, it has been found that when these strips are welded they undergo considerable transverse shrinkage which gives rise to unattractive creases and ripples in the containers. In addition, the evacuation stage of the containers is considerably compromised and also causes shrinkage.

SUMMARY OF THE INVENTION

The object of the present invention is to provide a machine in which the aforementioned defects are all effectively eliminated, so as to make the use of the packaging machine general for any type of thermoweldable material used for the strips.

This object is attained by a machine comprising a carriage driven with reciprocating motion parallel to the strip feed direction, a plurality of suction tubes supported by said carriage and positioned so as to penetrate between the strips at the point where they become superimposed, and connected to suction means for evacuating the formed cavities, pincer means for gripping the lateral edges of the strips, which are disposed at the height of the welding means and are forced in the direction of mutual withdrawal to keep the strips taut during the welding stage, the welding means having a perimeter which comprises two longitudinal portions for welding the strips between the adjacent cavities of longitudinal rows, from the ends downstream of said longitudinal portions there extending transverse segments and the upstream ends of said longitudinal portions being connected by a transverse portion in which a seat is provided for the penetration of the tubes, and one of said segments being arranged to integrate at each carriage stroke the welding of those strips which have remained unwelded at said seat, the carriage stroke being such that the mouths of the tubes are brought from a position downstream of the transverse segments to a position upstream of them.

BRIEF DESCRIPTION OF THE DRAWINGS

Further characteristics will be more evident from the detailed description given hereinafter of one embodiment of the invention illustrated by way of example in the accompanying drawing in which:

FIG. 1 is a perspective view of a packaging machine provided with the device according to the invention;

FIG. 2 is a side elevation of the machine shown in FIG. 1;

FIG. 3 is a view on the line III—III of FIG. 2;

FIG. 4 is a view on the line IV—IV of FIG. 2, and

FIG. 5 is a view on the line V—V of FIG. 2.

DESCRIPTION OF A PREFERRED EMBODIMENT

The figures show a strip of thermoweldable material 1, in which cavities 2 are formed in a conventional manner. The cavities 2 are disposed in four longitudinal rows and are aligned along traverse rows. The strip 1 advances in the direction indicated by the arrow f1 with intermittent motion at a pitch equal to the distance between the transverse rows.

To cover the cavities 2, which have already been filled with the product in an upstream station which is not shown, a strip 3 is applied, withdrawn from a reel and transmitted horizontally by an idle roller 4. This roller 4 is rotatably supported in a carriage indicated overall by 5 and comprising a pair of bars 6 positioned on each side of the strip 1 and connected together both by the roller 4 and a tube 7 which is retained by clamps 8 provided at the ends of the bars 6.

The tube 7 is connected by a connector 9 to a suction pump, and forms the manifold from which the various suction nozzles branch for evacuating the containers.

Respective bearings 10 are supported at the ends of the tube 7 external to the bars 6 for the sliding of the carriage on rails 11. The carriage is driven back and forth along the rails 11 by a lever 12 articulatedly coupled to a lower appendix 13 of the bars 6 and keyed onto a shaft 14 rotatably supported in the machine frame.

The oscillation of the lever 12, and hence of the shaft 14, is controlled by a cam not shown on the drawing, by way of a suitable linkage.

For each row of cavities 2, a suction nozzle is connected to the manifold comprising a tube 15 of flat elliptical cross section which extends horizontally in the plane joining the strips 1 and 3, and is positioned in the direction f1. The tube 15 has a portion bent at 90° upwards and inserted in a bush 16 rotatable in a block 17.

Between the block 17 and a ring 18 rigid with the bush 16 acts a spring 19, operating in torsion, which tends to keep the tube 15 in the longitudinal position.

The tube 15 emerges upperly from the block 17 and is connected to the manifold 7 by way of a flexible tube 20. The lateral blocks 17 are provided with a shank rotatably supported in a sleeve 21 fixed on the manifold 7, and a vertical rod 23 is rigidly fixed by a clamp 22 on the end of the shank projecting from the opposite side.

The rod 23 has its summit inserted in a respective fork 24 supported by an angle piece 25 of a bracket 26 on the frame 27. The fork defines a step 28 against which the rod 23 engages during the carriage movements, as will be more evident hereinafter. The welding means for the containers comprise an upper part indicated overall by 29 and a lower part 30. The upper part 29 consists of the actual welder, i.e., the heating elements, while the lower part represents the backing member for these elements.

The welder 29 is supported by a shaft 31 driven in an oscillating manner so that it approaches the upper strip 3 and assumes a horizontal position at the moment in which it is pressed against the strip.

The backing member 30 is mobile vertically between a position in which its backing plane for the welder is coplanar with the lower surface of the strip 1 and a position in which this plane lies below the bottom of the cavities 2. The backing member 30 comprises a transverse rib 32, perpendicular to which are welded longitudinal ribs 33 which at their ends carry aligned transverse segments 34. Sections 35 are rigid above these ribs and segments, their cross section being in the form of a U open upwards, in which are housed strips 36 of heat resistant plastics material. The backing member 30 is fixed by brackets 37 to two fins 38 fixed diametrically on the summit of a shaft 39 and to which, on the opposite face, are fixed two brackets 40 bent downwards. The ends of the brackets 40 are connected by a rod 41 which carries a stop dowel 42. During the upward and downward movements of the backing member 30, the stop dowel 42 engages against an adjustable screw 43 screwed into the horizontal part of a stirrup 44 fixed to the machine frame.

It is evident that the force exerted by the welder 29 on the backing member 30 during welding its counterbalanced by the reaction of the dowel 42 on the adjustable screw 43, because of which the shaft 39 is only point loaded and does not undergo bending which could damage it.

As can be seen in FIG. 3, the backing member 30 (and similarly the welding elements of the welder 29) are comb shaped and define the same number of seats as there are cavities 2 in a transverse row.

The dimensions of these seats are such that they can house the cavities containing the products, which during the lowering of the backing member remain supported by platforms 45, interposed between the longitudinal ribs 33.

For ease of description it will be supposed hereinafter that each seat is defined by two longitudinal portions 46, 47, the upstream ends of which are connected by a transverse portion 48 and the downstream ends comprise two opposing appendices 49, 50.

The transverse portion 48 comprises a recess 48a close to the longitudinal portion 46 which can house one half of the cross section of the tube 15, the other half of the cross section being housed in a corresponding seat in the upper welder. Moreover the portion 48 is of greater width than the others.

The means for tensioning the strips during welding in the transverse direction will now be described. These means comprise on each side of the strips 1, 3, a pincer member indicated overall by 51. The pincer member comprises an angle plate 52 bolted on an element 53 which can be positioned along a guide 54. The guide 54 extends longitudinally and is rigidly fixed to the summit of a lever 55 keyed on to a shaft 56 rotatably supported in a support 57.

The plate 52 comprises a first appendix from which a tongue 58 extends transversely below the tape 1, and a second appendix to which a lever 59 is articulatedly coupled, comprising a tongue 60 transversely disposed above the strip 3 and tongue 58.

Between the tongues 58 and 60 there is an elastic blade 61 rigid with the appendix of the plate 52 and provided at its end with a rubber block 62 which remains between the strips 1 and 3.

Straddling the tongues 58, 60 there is a link 63 articulatedly coupled to the lever 59 and having its lower end connected to a cylindrical helical spring 64. The spring 64 has its other end fixed to a rod 65 rigid with the frame of the packaging machine.

Two pegs 67, between which an element 68 is articulatedly coupled, project transversely to the direction of the strip 1 from a plate 66, fixed to the guide 54 downstream of the pincer member 51. Said element supports a projecting idle roller 69, and is repelled in the manner of a rocker arm by a spring 70 disposed between the lower portion of the element 68 and the plate 66. On the summit of the element 68 there is hinged an angle plate 71 with one side positioned horizontally and supporting an idle roller 72 which cooperates with the roller 69. The edge of the already welded strips is led between the rollers 69 and 72, and the roller 70 is pressed against the roller 69 by a compression spring 73 acting between the vertical side of the angle plate 71 and the element 68.

Although not expressly stated, it is evident that pincer members analogous to those heretofore described and indicated by the reference numerals 51 to 73 are provided on the opposite side of the packaging strips, as can be seen in FIG. 5.

The transverse tension of the strips 1, 3 during welding is obtained by forcing the pincer members apart. For this purpose two arms 74, 75 are radially rigid with the shafts 56, and to the first of these arms a peg 76 is articulatedly coupled, on which is clamped a block 77 which engages in a slot 78 in the second arm. A tie rod 74a is articulatedly coupled to the arm 74 and is connected to drive means which raise it and lower it through a suitable distance for forcing the pincer members apart.

The operation of the packaging machine heretofore described is as follows. It will be supposed that the first transverse row of cavities 2 is between the welder 69 and backing member 40, with the strips downstream of the cavities already transversely welded with the exception of the zones deriving from the recesses 48a provided for passage of the tubes 15, which are positioned with their suction mouth at the transverse portion 49.

The strips are first put into transverse tension by forcing the pincer members 51 apart. For this purpose the levers 55 are rotated outwards so that the spring 64 is put into traction, and closes the tongues 58, 60 which approach each other and grip the edges of the strips 1, 3 and pull them laterally in cooperation with the rollers 69, 72. When the strips are properly taut, the welder 29 closes on the backing member 20, so welding around the cavities, the part between the opposing portions 49, 50 having been welded previously.

During the closure movement of the welders, the mouths of the tubes 15, which are under constant suction, project beyond the portions 49, as indicated by the dashed lines in FIG. 3, and are retracted shortly before the welders close so as to reach the position shown by continuous lines in FIG. 3.

The welders then open again and the said cycle is repeated in the manner heretofore described.

It should be noted that during the approach of the welders, the tubes 15 evacuate the containers which are already downstream of the welder, and they retract by a distance which is less than the width of the portions 48. In this manner they remain within the duct formed by the absence of welding caused by the presence of the recesses 48a. The evacuation of the downstream containers can thus continue until the moment in which this duct is closed in front of the tube mouths by the closure of the portions 49.

The arrangement by which a certain freedom of movement is allowed to the lateral tubes beyond that deriving from their elasticity has proved to be particularly advantageous. In this regard, the transverse shrinkage caused by welding is increased by the shrinkage deriving from the evacuation, and the tubes are advantageously able to move towards the longitudinal centre line by rotating parallel to themselves in the sleeves 21.

The invention is susceptible to numerous modifications all of which fall within the scope of the inventive idea. In particular, to cause the rotation of the tubes in the sleeves 21, a direct external control can be used instead of using the reaction of the rods 23 against the step 28 during movement of the carriage 5.

In the practical embodiment of the invention, the shapes and dimensions may be different from those described and illustrated by way of example.

I claim:

1. A machine for vacuum packaging various products, in particular food products, comprising means for supporting two reels of strip for forming the product containers, means for forming in at least one of said strips cavities for housing the products in transverse and longitudinal parallel rows, welding means for longitudinally and transversely welding the strips around the edges of said cavities after depositing the products to be packaged in them, comprising a carriage driven with reciprocating motion parallel to the strip feed direction, a pluralitiy of suction tubes supported by said carriage and positioned so as to penetrate between the strips at the point where they become superimposed, and connected to suction means for evacuating the formed cavities, pincer means for gripping the lateral edges of the strips, which are disposed at the height of the welding means and are forced in the direction of mutual withdrawal to keep the strips taut during the welding stage, the welding means having a perimeter which comprises two longitudinal portions for welding the strips between the adjacent cavities of longitudinal rows, from the ends downstream of said longitudinal portions there extending transverse segments and the upstream ends of said longitudinal portions being connected by a transverse portion in which a seat is provided for the penetration of the tubes, one of said transverse segments being arranged to integrate at each carriage stroke the welding of the strips at said seat, the carriage stroke being such that the mouths of the tubes are brought from a position downstream of the transverse segments to a position upstream of them.

2. A machine as claimed in claim 1, in which said tubes comprise a portion of flat elliptical cross section which extends horizontally in the plane joining the packaging strips and is positioned along the strip feed direction, and a portion bent upwards at 90° and connected by a flexible tube to the suction means supported in said carriage.

3. A machine as claimed in claim 2, in which said bent portion is inserted in a bush rotatably supported in a block in the carriage, between said block and a ring rigid with the bush there being interposed a spring which operates in torsion and is arranged to keep the horizontal portion of the tube in a longitudinal position.

4. A machine as claimed in claim 3, in which said blocks are provided with a shank rotatably supported in a sleeve along the strip feed direction, a vertical rod being radially rigid with said shank and having its summit inserted in a fork element comprising a step against which the rod engages during the longitudinal movements of the carriage to cause rotation of the tubes parallel to themselves.

5. A machine as claimed in claim 1, in which said pincer members comprise a pair of tongues disposed respectively above and below the lateral edges of the strips and mutually approachable, with one of said tongues, there being rigid a blade which projects between the strips for locking them, said tongues being supported at the summit of respective levers supported lateral to the strips in such a manner as to oscillate in a plane normal to the strip feed direction, and driven in opposing directions.

6. A machine as claimed in claim 5, in which a longitudinal bar is rigid with the summit of said levers, the bar carrying a pair of idle rollers cooperating together and thrust by elastic means against each other, and between which the edge of the packaging strips is led.

* * * * *